(12) United States Patent
Bäckman et al.

(10) Patent No.: US 6,441,096 B1
(45) Date of Patent: *Aug. 27, 2002

(54) POLYMER COMPOSITION FOR PIPES

(75) Inventors: Mats Bäckman, Göteborg (SE); Eeva-Leena Heino, Helsinki (FI); Solveig Johansson, Stenungsund (SE); Jussi Laurell, Borgå (FI); Arja Lehtinen, Helsinki (FI); Jarmo Lindroos, Tolkkinen (FI); Marja Ora, Vantaa (FI); Elisabeth Ribarits, Spekeröd (SE); Teija Sihvonen; Jari Äärilä, both of Borgå (FI)

(73) Assignee: Borealis Technology Oy, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/832,227

(22) Filed: Apr. 10, 2001

Related U.S. Application Data

(63) Continuation of application No. PCT/SE99/01679, filed on Sep. 24, 1999.

(30) Foreign Application Priority Data

Oct. 14, 1998 (SE) ................................. 9803501

(51) Int. Cl.$^7$ .......................... C08L 23/00; C08L 23/04; F16L 9/22; E21B 17/10
(52) U.S. Cl. ................. 525/240; 138/177; 138/DIG. 7; 166/242.1
(58) Field of Search .......................... 525/240; 138/177, 138/DIG. 7; 166/242.1

(56) References Cited

U.S. PATENT DOCUMENTS

| | | | |
|---|---|---|---|
| 5,260,384 A | 11/1993 | Morimoto et al. | 525/240 |
| 5,306,775 A | 4/1994 | Martin et al. | 525/240 |
| 5,338,589 A | 8/1994 | Böhm et al. | 428/36.9 |
| 6,185,349 B1 * | 2/2001 | Dammert et al. | 385/100 |

FOREIGN PATENT DOCUMENTS

WO    WO 94/22948    10/1994

* cited by examiner

*Primary Examiner*—Nathan M. Nutter
(74) *Attorney, Agent, or Firm*—Merchant & Gould P.C.

(57) ABSTRACT

A multimodal polymer composition for pipes is disclosed as well as a pipes made thereof. The polymer is a multimodal polyethylene with a density of 0.930–0.965 g/cm$^3$, and a viscosity at a shear stress of 747 Pa $(\eta_{747\ Pa})$ of at least 650 Pa.s, said multimodal polyethylene comprising a low molecular weight (LMW) ethylene homopolymer fraction and a high molecular weight (HMW) ethylene copolymer fraction, said HMW fraction having a weight ratio of the LMW fraction to the HMW fraction of (35–55):(65–45). Preferably, the multimodal polyethylene has a viscosity at a shear stress of 2.7 kPa $(\eta_{2.7\ kPa})$ of 260–450 kPa.s; and a shear thinning index (SHI) defined as the ratio of the viscosities at shear stresses of 2.7 and 210 kPa, respectively, of SHI$_{2.7/210}$=50–150, and a storage modulus (G') at a loss modulus (G") of 5 kPa, of G'$_{5\ kPa}$≧3000 Pa. The pipe is made of the multimodal polymer composition and withstands a stress of 8.0 MPa gauge during 50 years at 20° C. (MRS8.0). Preferably, the pipe has a rapid crack propagation (RCP) S4-value, determined according to ISO 13477:1997 (E), of −5° C. or lower and a slow crack propagation resistance, determined according to ISO 13479:1997, of at least 500 hrs at 4.6 MPa/80° C. The polymer composition affords good non-sagging properties to pipe made thereof.

18 Claims, No Drawings

POLYMER COMPOSITION FOR PIPES

This application is a continuation of international application number PCT/SE99/01679, filed Sep. 24, 1999, pending.

FIELD OF THE INVENTION

The present invention relates to a multimodal polymer composition for pipes and a pipe prepared thereof.

BACKGROUND OF THE INVENTION

Nowadays, pipes of polymer material are frequently used for various purposes, such as fluid transport, i.e. transport of liquid or gas, e.g. water or natural gas, during which the fluid can be pressurised. Moreover, the transported fluid may have varying temperatures, usually within the temperature range from about 0° C. to about 50° C. Such pressure pipes are preferably made of polyolefin plastic, usually unimodal ethylene plastic such as medium density polyethylene (MDPE; density: 0.930–0.942 g/cm$^3$) and high density polyethylene (HDPE; density: 0.942–0.965 g/cm$^3$). By the expression "pressure pipe" herein is meant a pipe which, when used, is subjected to a positive pressure, i.e. the pressure inside the pipe is higher than the pressure outside the pipe.

Polymer pipes are generally manufactured by extrusion, or, to a smaller extent, by injection moulding. A conventional plant for extrusion of polymer pipes comprises an extruder, a die-head, a calibrating device, cooling equipment, a pulling device, and a device for cutting or for coiling-up the pipe.

The manufacture of PE materials to be used in pressure pipes is discussed in an article by Scheirs et al [Scheirs, Böhm, Boot and Leevers: PE100 Resins for Pipe Applications, TRIP Vol. 4, No 12 (1996) pp. 408–415]. The authors discuss the production technology and properties of PE100 pipe materials. They point out the importance of proper comonomer distribution and molecular weight distribution to optimize the slow crack growth and rapid crack propagation.

The European patent application EP 739937 A2 discloses a pipe having improved properties. The pipe is made of a bimodal PE resin, and it has a specified stress cracking resistance, impact strength and stiffness. The publication discloses that preferably the material should have an MFR$_5$ not higher than 0.35 g/10 min.

The properties of conventional polymer pipes are sufficient for many purposes, although enhanced properties may be desired, for instance in applications requiring high pressure resistance, i.e. pipes that are subjected to an internal fluid pressure for a long and/or short period of time. As examples of properties which it is desirable to improve may be mentioned the processability, the impact strength, the modulus of elasticity, the rapid crack propagation resistance, the slow crack growth resistance, and the design stress rating of the pipe.

A problem when manufacturing large diameter pipes, particularly from multimodal, such as bimodal, polymer material, is that it is difficult to maintain uniform dimensions all over the pipe. This is due to gravity flow of the polymer melt, causing it to flow from the upper part of the pipe to the lower part (often called "sagging"). Thus, the wall thickness at the upper part of the pipe becomes smaller than at the lower part of the pipe. The sagging problem is particularly pronounced for thick-walled large diameter pipes.

The above sagging problem has been discussed in the German patent application DE 19604196 A1. It discloses a process to manufacture a large-bore, thick walled pipe of polyethylene. The pipe is extruded through a ring formed die and cooled on both inner and outer surfaces. This double sided cooling is said to eliminate the deformation of the pipe due to gravity-induced flow of the melt emerging from the die.

The sagging problem has also been discussed in an article by D. N. Githuku and A. J. Giacomin, "Elimination of Sag in Plastic Pipe Extrusion", Intern. Polymer Processing VII (1992) 2, 140–143. The conventional way to reduce sag is by manually adjusting the die eccentricity which typically requires three or four tries at start-up to get an acceptable thickness profile. The article proposes a new way to reduce sag, namely by rotating the pipe during cooling.

A mathematical mode of cooling and solidification, coupled with gravity induced flow during the cooling of extruded plastic pipes is set up and solved by the finite element method in an article by J. F. T. Pittman, G. P. Whitman, S. Beech, and D. Gwynn, "Cooling and Wall Thickness Uniformity in Plastic Pipe Manufacture", Intern. Polymer Processing IX (1994) 2, 130–140. Melt rheology and determination of melt flow properties at the very low stress levels that are relevant at sag is also discussed.

SUMMARY OF THE INVENTION

It has now been discovered that the above sagging problem can be overcome by preparing the pipe from a specific, well defined type of multimodal polyethylene. More particularly, the multimodal polyethylene should have a medium to high density, a high viscosity at low shear stress, a carefully selected ratio between its low molecular weight fraction and high molecular weight fraction, and include a comonomer in its high molecular weight fraction only. Preferably, the multimodal polyethylene should have a specific molecular weight and a well defined molecular weight distribution.

Thus, the present invention provides a multimodal polymer composition for pipes, characterised in that it is a multimodal polyethylene with a density of 0.930–0.965 g/cm$^3$, and a viscosity at a constant shear stress of 747 Pa ($\eta_{747}$ Pa) of at least 650 kPa.s, said multimodal polyethylene comprising a low molecular weight (LMW) ethylene homopolymer fraction and a high molecular weight (HMW) ethylene copolymer fraction, said HMW fraction having a weight ratio of the LMW fraction to the HMW fraction of (35–55):(65–45)

It is much preferred that the multimodal polyethylene has a viscosity at a shear stress of 2.7 kPa ($\eta_{2.7}$ kPa) of 260–450 kPa.s; and a shear thinning index (SHI), defined as the ratio of the viscosities at shear stresses of 2.7 kPa and 210 kPa, respectively, of SHI$_{2.7/210}$=50–150, and a storage modulus (G') at a loss modulus (G") of 5 kPa, of G'$_{5\ kPa}$≧3000 Pa. Preferably densities in the range 0.937–0.942 g/cm$^3$ are used for smaller diameter MD pressure pipes while higher densities of 0.943–0.955 g/cm$^3$ are used for larger diameter HD pressure pipes.

The present invention also provides a pipe comprising said multimodal polymer composition, which pipe withstands a hoop stress of 8.0 MPa gauge during 50 years at 20° C. (MRS8.0)

Preferably, the pipe has a rapid crack propagation (RCP) S4-value, determined according to ISO 13477:1997(E), of −5° C. or lower and a slow crack propagation resistance, determined according to ISO 13479:1997, of at least 500 hrs at 4.6 MPa/80° C.

Other distinguishing features and advantages of the invention will appear from the following specification and the appended claims.

DETAILED DESCRIPTION OF THE INVENTION

As stated above, the pressure pipe composition of the present invention is made from a specific multimodal polyethylene. This is in contrast to prior art polyethylene pipes which usually are made of unimodal polyethylene or bimodal polyethylene which does not have the specific molecular weight distribution and composition of the multimodal polyethylene of the present invention.

The "modality" of a polymer refers to the form of its molecular weight distribution curve, i.e. the appearance of the graph of the polymer weight fraction as function of its molecular weight. If the polymer is produced in a sequential step process, utilizing reactors coupled in series and using different conditions in each reactor, the different fractions produced in the different reactors will each have their own molecular weight distribution. When the molecular weight distribution curves from these fractions are superimposed into the molecular weight distribution curve for the total resulting polymer product, that curve will show two or more maxima or at least be distinctly broadened in comparison with the curves for the individual fractions. Such a polymer product, produced in two or more serial steps, is called bimodal or multimodal depending on the number of steps. In the following all polymers thus produced in two or more sequential steps are called "multimodal". It is to be noted here that also the chemical compositions of the different fractions may be different. Thus one or more fractions may consist of an ethylene copolymer, while one or more others may consist of ethylene homopolymer.

By properly selecting the different polymer fractions and the proportions thereof in the multimodal polyethylene a pipe with good non-sagging properties together with good processability, good slow crack growth resistance, rapid crack propagation resistance, and a high design stress rating is obtainable.

The pressure pipe composition of the present invention is a multimodal polyethylene, preferably a bimodal polyethylene. The multimodal polyethylene comprises a low molecular weight (LMW) ethylene homopolymer fraction and a high molecular weight (HMW) ethylene copolymer fraction. Depending on whether the multimodal polyethylene is bimodal or has a higher modality the LMW and HMW fractions may comprise only one fraction each or include sub-fractions, i.e. the LMW may comprise two or more LMW sub-fractions and similarly the HMW fraction may comprise two or more HMW sub-fractions. It is a characterising feature of the present invention that the LMW fraction is an ethylene homopolymer and that the HMW fraction is an ethylene copolymer, i.e. it is only the HMW fraction that includes a comonomer. As a matter of definition, the expression "ethylene homopolymer" used herein relates to an ethylene polymer that consists substantially, i.e. to at least 97% by weight, preferably at least 99% by weight, more preferably at least 99.5% by weight, and most preferably at least 99.8% by weight of ethylene and thus is an HD ethylene polymer which preferably only includes ethylene monomer units. Preferably, the lower limit of the molecular weight range of the HMW fraction is 3 500, more preferably 4000, which means that almost all ethylene copolymer molecules in the multimodal polyethylene pipe composition of the invention have a molecular weight of at least 3500, preferably at least 4000. This preferred lower limit of the HMW fraction gives a pressure pipe with enhanced strength.

In the present invention it is further important that the proportions of the LMW and HMW fractions (also known as the "split" between the fractions) are selected properly. More particularly, the weight ratio of the LMW fraction to the HMW fraction should lie in the range (35–55):(65–45), preferably (43–51):(57–49), most preferably (44–50): (56–50). It is important that the split lies within these ranges, because if the proportion of the HMW fraction becomes too great it results in too low strength values and if it is too low it results in an unacceptable formation of gels.

In order to achieve the non-sagging characteristics of the multimodal polyethylene of the present invention it is important that the polymer after being extruded into a pipe and before being cooled does not flow by gravity from the upper part of the pipe down to the lower part of the pipe and thus creates a non-uniform distribution of polymer over the cross-section of the pipe.

The tendency of a polymer to display gravity flow may be determined by means of a conventional melt index apparatus, such as a Göttfert melt index apparatus. Generally, a polymer sample is introduced into the bore (9.550 mm diameter; ISO 1133) of the melt index apparatus, the temperature is set at 230° C., the bottom die is removed, and the polymer loaded with a weight corresponding to the force of gravity that would have acted upon the polymer if it had constituted the upper part of a pipe. One has found that the piston (which weighs 120 g) of the melt index apparatus corresponds to the gravity force on the polymer at the upper part of a 2.2 m diameter pipe, and it is therefore suitable to use the piston without any extra weight as the gravity force acting upon the polymer sample. During the test the polymer flow is determined at intervals for 75 min and the average gravity flow is then determined in mm/10 min. At the present invention the gravity flow of the polymer should be less than 0.1 mm/10 min. A more detailed description of the steps of the gravity flow determination method is given below.

1. Set the temperature to 230° C. and let it stabilise.
2. Weight the piston to an accuracy of 0.1 g.
3. When the temperature is stable insert 6–8 g of the material to be measured.
4. Let the material heat soak for 10 min.
5. After 10 min open the bottom holder for the die and press out the die by pressing the melt pool from above.
6. Take away the die and apply the piston. Press down the piston until the lower marking scratch on the piston is 29 mm above the filling hole.
7. Let the melt pool relax for 10 min as some materials have a more pronounced melt elasticity than others and the induced elasticity from the pressing down of the melt pool may influence the result.
8. Start the measurement by measuring the height of the lower marking scratch above the filling hole with a sliding caliper to an accuracy of 0.1 mm. Start the stop watch.
9. Make a measurement of the height above the filing hole each 20 min and make a final measurement after 75 min.
10. Make notes and present the results of the height each 20 min. Calculate the travelling distance each 20 min in mm as well as the travelling speed expressed as mm/10 min. Finally calculate the average travelling distance and velocity after 75 min (travel. dist/75) and make a report.
11. Clean the equipment in the normal manner.

Although the above method is a simple and easy way of determining the sagging property of a pipe material, the accuracy for very low gravity flow materials is somewhat uncertain. In order to remedy this disadvantage it is preferred to use another method which correlates well with the above described gravity flow method, but gives greater accuracy for materials with very low gravity flow. This preferred method, which is used in connection with the present invention relates to the rheology of the polymer and is based on determination of the viscosity of the polymer at a very low, constant shear stress. A shear stress of 747 Pa has been selected for this method. The viscosity of the polymer at this shear stress is determined at a temperature of 190° C. and has been found to be inversely proportional to the gravity flow of the polymer, i.e. the greater the viscosity the lower the gravity flow. At the present invention the viscosity at 747 Pa and 190° C. should be at least 650 kPa.s. A more detailed description of the steps of the method for determination of the viscosity of the polymer at 747 Pa and 190° C. is given below.

The determination is made by using a rheometer, preferably a Bohlin CS Melt Rheometer. Rheometers and their function have been described in "Encyclopedia of Polymer Science and Engineering", 2nd Ed., Vol. 14, pp. 492–509. The measurements are performed under a constant stress between two 25 mm diameter plates (constant rotation direction). The gap between the plates is 1.8 mm. An 1.8 mm thick polymer sample is inserted between the plates.

The sample is temperature conditioned during 2 min before the measurement is started. The measurement is performed at 190° C. After temperature conditioning the measurement starts by applying the predetermined stress. The stress is maintained during 1800 s to let the system approach steady state conditions. After this time the measurement starts and the viscosity is calculated.

The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

Rheology measurements according to ASTM D 4440–95a may also be used to characterise other important properties of the polymer, such as the molecular weight and molecular weight distribution (MWD).

The use of rheology is advantageous in those cases where the high molecular weight end of the molecular weight distribution is important. Typically, size exclusion chromatography (gel permeation chromatography), which often is used to measure the molecular weight distribution, is not sensitive enough in this molecular weight range.

The storage modulus (G') and the loss modulus (G'') together with the absolute value of the complex viscosity ($\eta^*$) as a function of the frequency ($\omega$) or the absolute value of the complex modulus (G*) are obtained by rheology measurements.

$$\eta^* = \sqrt{(G'^2 + G''^2)}/\omega$$

$$G^* = \sqrt{(G'^2 + G''^2)}$$

According to Cox-Merz rule the complex viscosity function, $\eta^*(\omega)$ is the same as the conventional viscosity function (viscosity as a function of shear rate), if frequency is taken in rad/s. If this empiric equation is valid, the absolute value of the complex modulus corresponds to the shear stress in conventional (that is steady state) viscosity measurements. This means that the function $\eta^*(G^*)$ is the same as the viscosity as a function of shear stress.

In the present method the viscosity at a low shear stress or $\eta^*$ at a low G* (which serves as an approximation of the so called zero viscosity) is used as a measure of average molecular weight.

According to the invention, $\eta_{2.7\ kPa}$ (viscosity at 2.7 kPa shear stress) should be between 260–450 kPa.s.

On the other hand, shear thinning, that is the decrease of viscosity with G*, gets more pronounced the broader the molecular weight distribution is. This property can be approximated by defining a so called shear thinning index, SHI, as a ratio of the viscosity at two different shear stresses. In the present invention the shear stresses (or G*) 2.7 kPa and 210 kPa are used for calculating the $SHI_{2.7/210}$ as a measure of the broadness of the molecular weight distribution.

$$SHI_{2.7/210} = \eta^*_{2.7}/\eta^*_{210}$$

where $\eta^*_{2.7}$ is the complex viscosity at G*=2.7 kPa and $\eta^*_{210}$ is the complex viscosity at G*=210 kPa.

According to the invention, $SHI_{2.7/210}$ should be between 50–150.

The storage modulus, G', may also be used as a measure of the molecular weight distribution. As mentioned above, the storage modulus function, G' ($\omega$) and the loss modulus function G'' ($\omega$), are obtained as primary functions from dynamic measurements. The value of the storage modulus at a specific value of loss modulus increases with broadness of the molecular weight distribution. However this quantity is highly dependent on the shape of the molecular weight distribution of the polymer. Especially it is a measure of the high molecular weight end of the molecular weight distribution. According to the invention, the material should have a $G'_{5\ kPa}$ (G' at G''=5 kPa) $\geq$ 3000 Pa.

Rheological measurements were made using the dynamic rheometers Bohlin Cs Melt Rheometer like Rheometrics RDA II. The measurements were performed at 190° C. under nitrogen atmosphere using plate & plate test fixture with diameter of 25 mm. The strain amplitude was chosen so that a linear working range was obtained. From the measurements storage modulus (G') and loss modulus (G'') together with absolute value of complex viscosity ($\eta^*$) as a function of frequency ($\omega$) or the absolute value of complex modulus (G*) were obtained.

It has been found that when the polymer has been prepared to have the above-mentioned characteristics, the resulting material has low tendency for sagging. It also has a good extrudability and good mechanical properties. All the rheological measurements (except the determination of G', which was made using a Rheometrics RDA II Dynamic Rheometer) have been made using a Bohlin CS Melt Rheometer and were carried out at 190° C. under nitrogen atmosphere.

The melt flow rate (MFR), which is equivalent to the term "melt index" previously used, is another important property of the multimodal polyethylene for pipes according to the invention. The MFR is determined according to ISO 1133 and is indicated in g/10 min. The MFR is an indication of the flowability, and hence the processability, of the polymer. The higher the melt flow rate, the lower the viscosity of the polymer. The MFR is determined at different loadings such as 2.1 kg ($MFR_{2.1}$; ISO 1133, condition D) or 5 kg ($MFR_5$; ISO 1133, condition T). At the present invention the multimodal polyethylene should have an $MFR_5$ of 0.1–1.0 g/10 min, preferably 0.15–0.8 g/10 min.

Another characterising feature of the present invention is the density of the multimodal polyethylene. For reasons of strength the density lies in the medium to high density range, more particularly in the range 0.930–0.965 g/cm³. Preferably, lower densities of 0.937–0.942 g/cm³ are used for smaller diameter MD pressure pipes, while higher densities of 0.943–0.955 g/cm³ are used for larger diameter HD pressure pipes. The pressure pipes of medium density multimodal polyethylene are somewhat more flexible than pressure pipes of high density multimodal polyethylene and may therefore more easily be coiled into a roll. On the other hand it is possible to obtain pressure pipes of a higher design stress rating with high density multimodal polyethylene than with medium density multimodal polyethylene.

It should be noted that the multimodal polymer composition of the present invention is characterised, not by any single one of the above defined features, but by the combination of all the features defined in claim 1. By this unique combination of features it is possible to obtain pressure pipes of superior performance, particularly with regard to sagging, processability, rapid crack propagation (RCP) resistance, design stress rating, impact strength, and slow crack propagation resistance.

The processability of a pipe (or rather the polymer thereof) may be determined in terms of the number of screw revolutions per minute (rpm) of an extruder for a predetermined output of pipe in kg/h, but also the surface appearance of the pipe is then important.

The rapid crack propagation (RCP) resistance of a pipe may be determined according to a method called the S4 test (Small Scale Steady State), which has been developed at Imperial College, London, and which is described in ISO 13477:1997(E). According to the RCP-S4 test a pipe is tested, which has an axial length not below 7 pipe diameters. The outer diameter of the pipe is about 110 mm or greater and its wall thickness about 10 mm or greater. When determining the RCP properties of a pipe in connection with the present invention, the outer diameter and the wall thickness have been selected to be 110 mm and 10 mm, respectively. While the exterior of the pipe is at ambient pressure (atmospheric pressure), the pipe is pressurised internally, and the internal pressure in the pipe is kept constant at a pressure of 0.5 MPa positive pressure. The pipe and the equipment surrounding it are thermostatted to a predetermined temperature. A number of discs have been mounted on a shaft inside the pipe to prevent decompression during the tests. A knife projectile is shot, with well-defined forms, towards the pipe close to its one end in the so-called initiating zone in order to start a rapidly running axial crack. The initiating zone is provided with an abutment for avoiding unnecessary deformation of the pipe. The test equipment is adjusted in such a manner that crack initiation takes place in the material involved, and a number of tests are effected at varying temperatures. The axial crack length in the measuring zone, having a total length of 4.5 diameters, is measured for each test and is plotted against the set test temperature. If the crack length exceeds 4 diameters, the crack is assessed to propagate. If the pipe passes the test at a given temperature, the temperature is lowered successively until a temperature is reached, at which the pipe no longer passes the test, but the crack propagation exceeds 4 times the pipe diameter. The critical temperature ($T_{crit}$) i.e. the ductile brittle transition temperature as measured according to ISO 13477:1997(E) is the lowest temperature at which the pipe passes the test. The lower the critical temperature the better, since it results in an extension of the applicability of the pipe. It is desirable for the critical temperature to be around −5° C. or lower. A pressure pipe made of the multimodal polymer composition according to the present invention preferably has an RCP-S4 value of −1° C. (minimum requirement for an MD PE80 pipe) or lower, more preferably −4° C. (minimum requirement for an HD PE80 pipe) or lower, and most preferably −7° C. (minimum requirement for an HD PE100 pipe) or lower.

The design stress rating is the circumferential stress a pipe is designed to withstand for 50 years without failure and is determined for different temperatures in terms of the Minimum Required Strength (MRS) according to ISO/TR 9080. Thus, MRS8.0 means that the pipe is a pipe withstanding a hoop stress of 8.0 MPa gauge for 50 years at 20° C., and similarly MRS10.0 means that the pipe withstands a hoop stress of 10 MPa gauge for 50 years at 20° C. A pressure pipe made of the multimodal polymer composition according to the present invention preferably has a design stress rating of at least MRS8.0, and most preferably MRS10.0.

The impact strength is determined as Charpy Impact Strength according to ISO 179. A pressure pipe made of the multimodal polymer composition according to the present invention preferably has an impact resistance at 0° C. of at least 10 kJ/m², more preferably at least 14 kJ/m², and most preferably at least 15 kJ/m².

The slow crack propagation resistance is determined according to ISO 13479:1997 in terms of the number of hours the pipe withstands a certain pressure at a certain temperature before failure. A pressure pipe made of the multimodal polymer composition according to the present invention preferably has a slow crack propagation resistance of at least 1000 hrs at 4.0 MPa/80° C., and more preferably at least 500 hrs at 4.6 MPa/80° C.

The modulus of elasticity is determined according to ISO 527-2 (with test specimen 1B). A pressure pipe made of the multimodal polymer composition according to the present invention preferably has a modulus of elasticity of at least 800 MPa, more preferably at least 950 MPa, and most preferably at least 1100 MPa.

A pressure pipe made of the multimodal polymer composition of the present invention is prepared in a conventional manner, preferably by extrusion in an extruder. This is a technique well known to the skilled person an no further particulars should therefore be necessary here concerning this aspect.

It is previously known to produce multimodal, in particular bimodal, olefin polymers, such as multimodal polyethylene, in two or more reactors connected in series. As instance of this prior art, mention may be made of EP 517 868, which is hereby incorporated by way of reference as regards the production of multimodal polymers.

According to the present invention, the main polymerisation stages are preferably carried out as a combination of slurry polymerisation/gas-phase polymerisation. The slurry polymerisation is preferably performed in a so-called loop reactor. The use of slurry polymerisation in a stirred-tank reactor is not preferred in the present invention, since such a method is not sufficiently flexible for the production of the inventive composition and involves solubility problems. In order to produce the inventive composition of improved properties, a flexible method is required. For this reason, it is preferred that the composition is produced in two main polymerisation stages in a combination of loop reactor/gas-phase reactor. Optionally and advantageously, the main polymerisation stages may be preceded by a prepolymerisation, in which case up to 20% by weight, preferably 1–10% by weight, more preferably 1–5% by weight, of the total amount of polymers is produced. The prepolymer is preferably an ethylene homopolymer (HDPE). At the prepolymerisation all of the catalyst is preferably charged into a loop reactor and the prepolymerisation is performed as a slurry polymerisation. Such a prepolymerisation leads to less fine particles being produced in the following reactors and to a more homogeneous product being obtained in the end. Generally, this technique results in a multimodal polymer mixture through polymerisation with the aid of a Ziegler-Natta or metallocene catalyst in several successive polymerisation reactors. Chromium catalysts are not preferred in connection with the present invention. In the production of, say, a bimodal polyethylene, which according to the invention is the preferred polymer, a first ethylene polymer is produced in a first reactor under certain conditions with respect to hydrogen-gas concentration, temperature, pressure, and so forth. After the polymerisation in the first reactor, the polymer including the catalyst is separated from the reaction mixture and transferred to a second reactor, where further polymerisation takes place under other conditions. Usually, a first polymer of high melt flow rate (low molecular weight, LMW) and with no addition of comonomer is produced in the first reactor, whereas a second polymer of low melt flow rate (high molecular weight, HMW) and with addition of comonomer is produced in the second reactor. As comonomer of the HMW fraction various alpha-olefins with 4–8 carbon atoms may be used, but the comonomer is preferably selected from the group consisting of 1-butene, 1-hexene, 4-methyl-1-pentene, and 1-octene. The amount of comonomer is preferably such that it comprises 0.1–2.0 mol %, more preferably 0.1–1.0 mol % of the multimodal polyethylene. The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer mixture. Since multimodal, and especially bimodal, ethylene polymers, and the production thereof belong to the prior art, no detailed description is called for here, but reference is had to the above mentioned EP 517 868.

As hinted above, it is preferred that the multimodal polyethylene composition according to the invention is a bimodal polymer mixture. It is also preferred that this bimodal polymer mixture has been produced by polymerisation as above under different polymerisation conditions in two or more polymerisation reactors connected in series. Owing to the flexibility with respect to reaction conditions thus obtained, it is most preferred that the polymerisation is carried out in a loop reactor/a gas-phase reactor. Preferably, the polymerisation conditions in the preferred two-stage method are so chosen that a comparatively low-molecular polymer having no content of comonomer is produced in one stage, preferably the first stage, owing to a high content of chain-transfer agent (hydrogen gas), whereas a high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 92–98° C., more preferably about 95° C., and the temperature in the gas-phase reactor preferably is 75–90° C., more preferably 82–87° C.

A chain-transfer agent, preferably hydrogen, is added as required to the reactors, and preferably 200–800 moles of H$_2$/kmoles of ethylene are added to the reactor, when the LMW fraction is produced in this reactor, and 0–50 moles of H$_2$/kmoles of ethylene are added to the gas phase reactor when this reactor is producing the HMW fraction.

As indicated earlier, the catalyst for polymerising the multimodal polyethylene of the invention preferably is a Ziegler-Natta type catalyst. Particularly preferred are catalysts with a high overall activity as well as a good activity balance over a wide range of hydrogen partial pressures. Furthermore, the molecular weight of the polymer produced by the catalyst is of great importance. As an example of a preferred catalyst may be mentioned the catalyst disclosed in FI 980788 and its corresponding PCT application PCT/FI99/00286. It has surprisingly been found that when using this catalyst in a multistage process, it is possible to obtain the polymer having the characterstics described above. This catalyst also has the advantage that the catalyst (procatalyst and cocatalyst) only needs to and, indeed, only should be added in the first polymerisation reactor. The preferred catalyst according to FI 980788 and its corresponding PCT application FI99/00286 will be described in more detail below.

FI 980788 and its corresponding PCT application PCT/FI99/00286 discloses a process for the production of a high activity procatalyst, characterized by the steps of reacting a support comprising a magnesium halide compound having the formula (1):

$$MgX_n(OR)_{2-n} \tag{1}$$

wherein each same or different R is a $C_1$–$C_{20}$ alkyl or a $C_7$–$C_{26}$ aralkyl, each same or different X is a halogen, and n is an integer 1 or 2, an alkyl metal halide compound having the formula:

a) according to PCT application PCT/FI99/00286

$$R_nM_mX_{(3m-n)} \tag{2a}$$

wherein Me is B or Al, R being the same or different is a $C_1$–$C_{10}$ alkyl, X being the same or different is a halogen, n is an integer of 1 to 5 and m is an integer of 1 or 2, or, preferably, b) according to FI 980788

$$(R^1{}_n{}^1MeX^1{}_{3-n}{}^1)m^1 \tag{2b}$$

wherein Me is B or Al, each same or different $R^1$ is a $C_1$–$C_{10}$ alkyl, each same or different $X^1$ is a halogen, $n^1$ is an integer 1 or 2, and $m^1$ is an integer 1 or 2, a magnesium composition containing magnesium bonded to a hydrocarbyl and magnesium bonded to a hydrocarbyl oxide, aid magnesium composition having the empirical formula (3):

$$R^2{}_n{}^2(OR^3)_{2-n}{}^2Mg \tag{3}$$

wherein each same or different $R^2$ is a $C_1$–$C_{20}$ alkyl, each same or different $R^3$ is a $C_1$–$C_{20}$ alkyl or a $C_1$–$C_{20}$ alkyl having a hetero element, and $n^2$ is between 0.01 and 1.99, and a titanium halide compound having the formula (4):

$$(OR^4)_n{}^3TiX^2{}_{4-n}{}^3 \tag{4}$$

wherein each same or different $R^4$ is a $C_1$–$C_{20}$ alkyl, each same or different $X^2$ is a halogen, $n^3$ is 0 or an integer 1–3, and Ti is quadrivalent titanium.

By "magnesium composition" above is meant a mixture or a compound. Note that formula (3) is an empirical formula and expresses the molar amounts of alkyl $R^2$ and alkoxy $OR^3$ relative to the amount of magnesium Mg, which has been defined as 1, and differs from formulas (1), (2a), (2b) and (4), which are essentially structural formulas and express the molecular structure of reagents (1), (2a), (2b) and (4).

Preferably, the process comprises the subsequent steps of:

a) providing said support comprising a magnesium halide compound having the formula (1), b) contacting said support comprising a magnesium halide compound having the formula (1) with said alkyl metal halide compound having the formula (2a) or (2b), to give a first product, c) contacting said first product with said magnesium composition containing magnesium bonded to a hydrocarbyl and magnesium bonded to a hydrocarbyl oxide and having the empirical formula (3), to give a second product, and d) contacting said second product with said titanium halide compound having the formula (4).

The support used in the process is preferably in the form of particles, the size of which is from about 1 $\mu$m to about 1000 $\mu$m, preferably about 10 $\mu$m to about 100 $\mu$m. The support material must have a suitable particle size distribution, a high porosity and a large specific surface area. A good result is achieved if the support material has a specific surface area between 100 and 500 m$^2$/g support and a pore volume of 1–3 ml/g support.

The above catalyst components (2a) to (4) are reacted with a suitable catalyst support. If the catalyst components (2a) to (4) are in the form of a solution of low viscosity, good catalyst morphology and therewith good polymer morphology can be achieved.

It is advantageous if in the magnesium halide compound having the formula (1), R is a $C_1$–$C_{20}$ alkoxy or a $C_7$–$C_{26}$ aralkoxy. However, it is preferable, if said compound (1) is a magnesium dihalide, most preferably MgCl$_2$ for example, the support may comprise solid MgCl$_2$, either alone as a powder, or as a powder mixture with other inorganic powders.

According to another embodiment, the support comprising a magnesium halide compound having the formula (1) comprises an inorganic oxide. Several oxides are suitable, but silicon, aluminium, titanium, chromium and zirconium oxide or mixtures thereof are preferred. The most preferred inorganic oxide is silica, alumina, silica-alumina, magnesia and mixtures thereof, uttermost preferably silica. The inorganic oxide can also be chemically pretreated, e.g. by silylation or by treatment with aluminium alkyls.

It is good to dry the inorganic oxide before impregnating it by other catalyst components. A good result is achieved if the oxide is heat-treated at 100° C. to 900° C. for a sufficient time, and thereby the surface hydroxyl groups, in the case of silica, are reduced to below 2 mmol/g SiO$_2$.

As was said above, the support may be a mixture of said magnesium halide compound (1) and another solid powder, which preferably is an inorganic oxide. According to another aspect, the support comprises particles having a core comprising said inorganic oxide and a shell comprising said magnesium halide compound having the formula (1). Then, the support comprising a magnesium halide compound having the formula (1) and an inorganic oxide can conveniently be prepared by treating particles of the inorganic oxide with a solution of the magnesium halide and removing the solvent by evaporation.

When using a support containing both said magnesium halide compound (1) and another component, the amount of magnesium halide compound (1) is such that the support contains from 1 to 20% by weight, preferably from 2 to 6% by weight, of magnesium Mg.

The process further comprises a step of reacting an alkyl metal halide compound of the formula:

a) according to PCT application PCT/FI99/00286

$$R_nM_mX_{(3m-n)} \quad (2a)$$

wherein Me is B or Al, R being the same or different is a $C_1$–$C_{10}$ alkyl, X being the same or different is a halogen, n is an integer of 1 to 5, and m is an integer of 1 or 2, or, preferably b) according to FI 980788

$$(R^1{}_n{}^1MeX^1{}_{3-n}{}^1)_m{}^1 \quad (2b)$$

wherein Me is B or Al, each same or different R$^1$ is a $C_1$–$C_{10}$ alkyl, each same or different X$^1$ is a halogen, n$^1$ is an integer 1 or 2, and m$^1$ is an integer 1 or 2. In formulas (2a) and (2b), Me is preferably Al. Each same or different R or R$^1$ is preferably a $C_1$–$C_6$ alkyl, and, independently, the preferred same or different halogen X or X$^1$ is chlorine. n or n$^1$ is preferably 1 and m$^1$ is Preferably the integer 1 or 2. Most preferably, the alkyl metal halide compound having the formulas (2a) and (2b) is an alkyl aluminium dichloride, e.g. ethylaluminium dichloride (EADC).

The alkyl metal halide compound is preferably deposited on the support material. An even deposition is achieved if the viscosity of the agent or its solution is below 10 mPa.s at the temperature applied. To achieve this low viscosity the alkyl metal halide agent can be diluted by a non-polar hydrocarbon. The best deposition is however achieved if the total volume of the deposited alkyl metal halide solution is not exceeding the pore volume of the support, or if the excess of diluting hydrocarbon is evaporated away after the deposition of the alkyl metal halide. A good choice is to use a 5–25% hydrocarbon solution of ethyl aluminium dichloride. The chemical addition times and the addition techniques are preferably adjusted to give an even distribution of the chemical in the support material.

In the above mentioned preferred order of reaction steps a) to d), step b) can advantageously be performed so that undiluted alkyl metal halide (2a) or (2b) is used to treat the support comprising a magnesium halide compound having the formula (1). Alternatively, the support is contacted with a solution of the alkyl metal halide compound having the formula (2a) or (2b) in an essentially non-polar solvent, preferably a non-polar hydrocarbon solvent, most preferably a $C_4$–$C_{10}$ hydrocarbon. The concentration of the alkyl metal halide compound having the formulas (2a) or (2b) in said non-polar solvent is usually 1–80% by weight, preferably 5–40% by weight, most preferably 10–30% by weight. Advantageously, the support is contacted with a solution of said alkyl metal halide compound (2a, 2b) in a ratio mol of the alkyl metal halide compound (2a, 2 b) to grams of the support of between about 0.01 mmol/g and about 100 mmol/g, preferably about 0.5 mmol/g and about 2.0 mmol/g. The amount of reactants can also be expressed as molar ratio, whereby it is advantageous, if the molar ratio of said alkyl metal halide compound (2a, 2b) to said magnesium halide compound (1) of the support is between about 0.01 mol/mol to about 100, preferably about 0.1 mol/mol to about 10, most preferably from about 0.2 to about 3.0.

In step b), the temperature of said contacting is e.g. 5–80° C., preferably 10–50° C., most preferably 20–40° C. The duration of said contacting is 0.1–3 h, preferably 0.5–1.5 h.

In the process, the magnesium composition containing magnesium bonded to a hydrocarbyl and magnesium bonded to a hydrocarbyl oxide having the empirical formula (3), each same or different R$^2$ is preferably $C_2$–$C_{10}$ alkyl, most preferably a $C_2$–$C_8$ alkyl. Each same or different R$^3$ is preferably a $C_3$–$C_{20}$ alkyl, more preferably a branched $C_4$–$C_{10}$ alkyl, most preferably a 2-ethyl-1-hexyl or a 2-propyl-1-pentyl.

The magnesium composition containing magnesium bonded to a hydrocarbyl and magnesium bonded to a hydrocarbyl oxide having the empirical formula (3) can also be expressed by its preparation. According to one embodiment, it is a contact product of a dialkyl magnesium having the formula (5):

$$R^2{}_2Mg \tag{5}$$

wherein each same or different $R^2$ is defined as above, and an alcohol. Preferably, the dialkyl magnesium having the formula (5) is dibutyl magnesium, butyl ethyl magnesium or butyl octyl magnesium.

The magnesium composition can also be defined in that the magnesium composition containing magnesium bonded to a hydrocarbyl and magnesium bonded to a hydrocarbyl oxide having the empirical formula (3) is a contact product of a dialkyl magnesium and an alcohol having the formula (6)

$$R^3OH \tag{6}$$

wherein each same or different $R^3$ is the same as above. Preferably, the alcohol having the formula (6) is a 2-alkyl alkanol, preferably 2-ethyl hexanol or 2-propyl pentanol. It was found, that such branched alcohols gave better results than linear alcohols.

Preferably, the magnesium composition containing magnesium bonded to a hydrocarbyl and magnesium bonded to a hydrocarbyl oxide having the empirical formula (3) is a contact product of a dialkyl magnesium and an alcohol in a molar ratio alcohol to dialkyl magnesium of 0.01–100 mol/mol, preferably 1.0–5.0 mol/mol, more preferably 1.7–2.0 mol/mol, most preferably 1.8–1.98 mol/mol. The dialkyl magnesium and the alcohol are conveniently contacted by adding the alcohol to a solution of said dialkyl magnesium in an organic solvent, e.g. a $C_4$–$C_{10}$ hydrocarbon. Then, the concentration of the solution is preferably between 1 and 50% by weight, most preferably between 10 and 30% by weight. The contacting temperature between the dialkyl magnesium and the alcohol is preferably 10–50° C., preferably from about 20° C. to about 35° C.

In step c) of the above mentioned preferred order a)→d) of the process, the contacting product of the support with the alkyl metal halide compound (2) (=said first product) is contacted with said magnesium composition containing magnesium bonded to a hydrocarbyl and magnesium bonded to a hydrocarbyl oxide and having the empirical formula (3).

Preferably, said first product is contacted with said magnesium composition (3) in a ratio moles of magnesium/g of the support between 0.001–1000 mmol/g, preferably 0.01–100 mmol/g, most preferably 0.1–10 mmol/g (g of the support means, in the case of said first reaction product, the support which was used as starting material for the first reaction product).

A good deposition of said magnesium composition as a solution is achieved if the volume of the magnesium composition (3) solution is about two times the pore volume of the support material. This is achieved if the concentration of the composition in a hydrocarbon solvent is between 5–60% in respect of the hydrocarbon used. When depositing the magnesium composition on the support material its hydrocarbon solution should have a viscosity that is lower than 10 mPa.s at the temperature applied. The viscosity of the magnesium complex solution can be adjusted for example by the choice of the group $R^4$ in the formula (3), by the choice of the concentration of the hydrocarbon solution, by the choice of the ratio between the magnesium alkyl and the alcohol or by using some viscosity lowering agent. The titanium compound can be added to the support material with or without a previous drying of the catalyst to remove the volatile hydrocarbons. Remaining hydrocarbons can if desired be removed by using slight underpressure, elevated temperature or nitrogen flash.

In the process, the transition metal compound is a titanium halide compound having the formula (4). $R^4$ is preferably a $C_2$–$C_8$ alkyl, most preferably a $C_2$–$C_6$ alkyl. $X^2$ is preferably chlorine and, independently, $n^3$ is preferably 0. Said titanium halide compound having the formula (4) is advantageously titanium tetrachloride.

According to one embodiment, in addition to said titanium compound having the formula (4), a titanium compound having the formula (7):

$$(R^5O)_{n^4}TiX^3{}_{4-n^4} \tag{7}$$

wherein each same of different $R^5$ is a $C_1$–$C_{20}$ alkyl, preferably a $C_2$–$C_8$ alkyl, most preferably a $C_2$–$C_6$ alkyl, each same or different $X^3$ is a halogen, preferably chlorine, $n^4$ is an integer 1–4, and Ti is quadrivalent titanium, is reacted. The titanium compound (7) always has at least one alkoxy group, which helps dissolving the titanium compound (4) which does not necessarily have alkoxide, into an organic solvent before the contacting. Naturally, the more alkoxide groups compound (4) has, the less is the need for compound (7). If compound (7) is used, the preferable combination is that of titanium tetrachloride and a titanium tetra $C_1$–$C_6$ alkoxide.

In step d) of the preferred step sequence a)→d), said second product is advantageously contacted with the titanium compound having the formula (4) in a ratio moles of said titanium compound/g of the support of 0.01–10 mmol/g, preferably 0.1–2 mmol/g. Preferably, said second reaction product is contacted with said titanium compound (4) in a ratio moles of said titanium compound (4)/total moles of the magnesium of 0.05–2 mol/mol, preferably 0.1–1.2 mol/mol, most preferably 0.2–0.7 mol/mol. The temperature is usually 10–80° C., preferably 30–60° C., most preferably from about 40° C. to about 50° C., and the contacting time is usually 0.5–10 h, preferably 2–8 h, most preferably from about 3.5 h to about 6.5 h.

Above, the process for the preparation of a high activity catalyst component for the production of olefin polymers of different molecular weight and homogenous consistence, have been described in detail.

The catalyst component has high activity both when producing low melt flow rate ethylene polymer and high melt flow rate polymer. High molecular weight polymer has high melt viscosity, i.e. low melt flow rate, and low molecular weight polymer has low melt viscosity, i.e. high melt flow rate.

Simultaneously or separately, it preferably produces ethylene homopolymer and copolymer with low gel content. Most preferably it produces ethylene homopolymer having a gel number, expressed as number of gel spots/sq.m in a film prepared from the material, of 0. This means, that by the standards used, the catalyst components can be used to produce totally homogenous (gelless) low and high molecular weight ethylene polymer.

The alkyl metal halide compound of the formula (2) can, if used, act completely or partially as a cocatalyst. However, it is preferable to add a cocatalyst having the formula (9):

$$R^6{}_{n^5}AlX^4{}_{3-n^5} \tag{9}$$

wherein $R^6$ is a $C_1$–$C_{20}$ alkyl, preferably a $C_1$–$C_{10}$ alkyl, most preferably a $C_2$–$C_6$ alkyl such as ethyl, X is halogen, preferably chlorine, n is 1 to 3, more preferably 2 or 3, most preferably 3, to the polymerization mixture. The cocatalyst having the formula (9) can be used irrespective of whether said alkyl metal halide compound (2) is used or not.

Although the invention has been described above with reference to a specified multimodal polyethylene, it should be understood that this multimodal polyethylene may include various additives such as fillers, etc. as is known and conventional in the art. An especially important additive is carbon black which is used to colour the pipe black. It should be noted that some additives may have a significant effect on the properties of the polymer. Thus, the density of the black compound is typically significantly higher than the density of the reactor product. Further, the pipe made of the specified multimodal polyethylene may be a single-layer pipe or form part of a multilayer pipe including further layers of other pipe materials.

Having thus described the present invention it will now be illustrated by way of non-limiting examples of preferred embodiments in order to further facilitate the understanding of the invention.

EXAMPLES

Example 1

Preparation of the Catalyst
Complex Preparation 8.6 g (66.4 mmol) of ethyl-1-hexanol was added slowly to 27.8 g (33.2 mmol) of a 19.9% by weight solution of butyl octyl magnesium. The reaction temperature was kept under 35° C. This complex was used in catalyst preparations. The molar ratio of 2-ethyl-1-hexanol to butyl octyl magnesium was 2:1.

Catalyst Preparation 3.7 g (1.0 mmol/g carrier) of 20% ethyl aluminium dichloride was added to 5.9 g of Sylopol 5510 silica/$MgCl_2$ carrier and the mixture was stirred for one hour at 30° C. 5.7 g (0.9 mmol/g carrier) of complex prepared according to "Complex preparation" was added and the mixture was stirred for 4 hours at 35–45° C. 0.6 g (0.55 mmol/g carrier) of $TiCl_4$ was added and the mixture was stirred for 4 hours at 35–45° C. The catalyst was dried at 45–80° C. for 3 hours. The composition of the catalyst obtained was Al 1.8%, Mg 3.9% and Cl 18.5% by weight.

Example 2

Inventive Material A (Two-stage Polymerisation with Prepolymerised Catalyst)

Into a 50 $dm^3$ loop reactor was added 7.0 g/h of catalyst prepared according to Example 1, 2 kg/h of ethylene, 20 kg/h of propane and 1 g/h of hydrogen. The operating temperature was 80° C. and the operating pressure 65 bar.

The slurry was taken out of the reactor and led into a 500 $dm^3$ loop reactor. The reactor was operated at 95° C. temperature and 61 bar pressure. The rate of polymer production was 35 kg/h and the $MFR_2$ of the polymer produced was 280 g/10 min. No comonomer was fed into the loop reactor.

From the loop reactor the polymer was transferred into a gas phase reactor where the polymerisation was continued. The reactor was operated at 85° C. and 20 bar pressure. Ethylene, hydrogen and 1-butene were fed into the reactor to obtain such conditions that the rate of polymer production was 41 kg/h, the $MFR_5$ of the polymer produced was 0.24 g/10 min and the density was 0.951 $kg/dm^3$.

The polymer was then compounded with 5.7% by weight of a carbon black master batch. The $MFR_5$ of the compounded material was 0.17 g/10 min and the density was 0.960 $kg/dm^3$.

The polymerisation data are collected in Table 1.

Example 3

Inventive Materials B–D (Further Two-stage Polymerisations With Prepolymerised Catalyst)

The procedure of Example 2 was repeated with the exception that 1-hexene was used as comonomer in the gas phase reactor. The data are collected in Table 1.

TABLE 1

| Material | A | B | C | D |
|---|---|---|---|---|
| Loop production kg/h | 35 | 31 | 33 | 32 |
| Loop $H_2/C_2$ | 340 | 620 | 620 | 610 |
| Loop MFR2 g/10 min | 280 | 1000 | 1010 | 1060 |
| GPR comonom. | 1-butene | 1-hexene | 1-hexene | 1-hexene |
| GPR production kg/h | 41 | 38 | 40 | 41 |
| GPR $H_2/C_2$ | 6 | 9 | 7 | 8 |
| GPR comon./$C_2$ mol/kmol | 68 | 41 | 37 | 37 |
| Fin. resin $MFR_5$ | 0.19 | 0.40 | 0.27 | 0.24 |
| Fin. resin density | 0.951 | 0.950 | 0.952 | 0.953 |
| Comonomer content, mol-% | 0.50 | 0.37 | 0.47 | 0.34 |
| Split | 2/44/54 | 2/44/54 | 2/45/53 | 2/43/55 |

The properties of the materials A–D after being compounded with CB master batch are shown i Table 2.

TABLE 2

| Resin with CB compound | A | B | C | D |
|---|---|---|---|---|
| Density $kg/dm^3$ | 0.960 | 0.962 | 0.960 | 0.960 |
| $MFR_5$ g/10 min | 0.17 | 0.29 | 0.25 | 0.21 |
| $MFR_{21}$ g/10 min | 5.0 | 11 | 9.3 | 7.5 |
| $FRR_{21/5}$ | 29 | 38 | 37 | 36 |
| $\eta_{2.7\ kPa}$ kPa.s | 425 | 292 | 359 | 397 |
| $SHI_{2.7/210}$ | 66 | 110 | 113 | 109 |
| $G'_{5\ kPa}$ Pa | 3100 | 3420 | 3405 | 3435 |
| $\eta_{747\ Pa}$ kPa.s | 1069 | 710 | 755 | 1070 |
| Gravity flow mm/10 min | 0.068 | 0.096 | 0.068 | 0.068 |
| Notch/ 4.6 Mpa h | | 1217(D) | >1434 | 1881(D) |
| RCP 4S $T_{crit}$ ° C. | | −7 | −7 | −11 |

TABLE 2-continued

| Resin with CB compound | A | B | ○ | D |
|---|---|---|---|---|
| Impact strength kJ/m² | 19 | 13 | 12 | 15 |

It is evident from Table 1 that the resins A–D according to the present invention all have very low gravity flows, below 0.1 mm/10 min, and high viscosities at the low shear stress of 747 Pa ($\eta_{747}$ Pa) of more than 650 kPa.s, i.e. the resins have good non-sagging properties. In addition, pipes made of the resins A–D have excellent physical properties, such as resistance to slow crack propagation, a low $T_{crit}$ for rapid crack propagation and good impact strength at 0° C.

The properties of some commercial bimodal PE100 materials E–G are shown in Table 3.

TABLE 3

| Material | E | F | G |
|---|---|---|---|
| Density kg/dm³ | 0.959 | 0.958 | 0.958 |
| MFR₅ g/10 min | 0.35 | 0.46 | 0.21 |
| MFR₂₁ g/10 min | 8.7 | 11.3 | 6.1 |
| FRR₂₁/₅ | 25 | 25 | 30 |
| $\eta_{2.7\ kPa}$ kPa.s | 138 | 89 | 264 |
| SHI$_{2.7/210}$ | 27.4 | 36 | 35 |
| G'$_{5\ kPa}$ Pa | 2630 | 2250 | 2480 |
| $\eta_{747\ Pa}$ kPa.s | 266 | 162 | 556 |
| Gravity flow mm/10 min | 0.95 | 1.58 | 0.66 |
| Notch/4.6 Mpa h | 1100 | 1069 | 2766 |
| RCP 4S $T_{crit}$ ° C. | −7 | −6 | −19 |
| Impact strength kJ/m² | 14.0 | 12.5 | 16.6 |

The materials E–G all show excellent strength properties but inferior sagging tendencies.

The properties of some commercial monomodal PE materials H–K are shown in Table 4.

TABLE 4

| Material | H (PE80) | I (PE63) | K (PE80) |
|---|---|---|---|
| Density kg/dm³ | 0.953 | 0.960 | 0.953 |
| MFR₅ g/10 min | 0.51 | 0.53 | 0.47 |
| MFR₂₁ g/10 min | 17.0 | 17.0 | 13.1 |
| FRR₂₁/₅ | 34.0 | 32.0 | 27.6 |
| $\eta_{2.7\ kPa}$ kPa.s | 305 | 208 | 263 |
| SHI$_{2.7/210\ kPa}$ | 215 | 175 | 94 |
| G'$_{5\ kPa}$ Pa | 4190 | | 3960 |
| $\eta_{747\ Pa}$ kPa.s | 1392 | 728 | 581 |
| Gravity flow mm/10 min | 0.13 | 0.17 | 0.33 |
| Notch/4.6 Mpa h | 97 | 8 | 100–200 |
| RCP 4S $T_{crit}$ ° C. | +29 | >+20 | >0 |
| Impact strength kJ/m² | 4.6 | 3.9 | |

As apparent from the comparative materials, it has hitherto not been found possible to combine the high strength, in terms of long term hoop stress resistance, low $T_{crit}$ in the RCP 4S-test and high impact strength, with good non-sagging property. The comparative bimodal PE100-materials all show good strength properties but have pronounced sagging tendencies, while of the monomodal materials H and I have low sagging tendency, but less good strength properties.

What is claimed is:

1. A multimodal polymer composition for pipes, wherein said multimodal polymer composition is a multimodal polyethylene with a density of 0.930–0.965 g/cm³, and a viscosity at a shear stress of 747 Pa ($\eta_{1747\ Pa}$) of at least 650 kPa.s, said multimodal polyethylene comprising a low weight average molecular weight (LMW) ethylene homopolymer fraction and a high weight average molecular weight (HMW) ethylene copolymer fraction, said HMW fraction having a weight ratio of the LMW fraction to the HMW fraction of (35–55):(65–45).

2. A multimodal polymer composition as claimed in claim 1, wherein the multimodal polyethylene has a viscosity at a shear stress of 2.7 kPa ($\eta_{2.7\ kPa}$) of 260–450 kPa.s; and a shear thinning index (SHI) defined as the ratio of the viscosities at shear stresses of 2.7 and 210 kPa, respectively, of SHI$_{2.7/210}$=50–150, and a storage modulus (G') at a loss modulus (G") of 5 kPa, of G'$_{5\ kPa}$≧3000 Pa.

3. A multimodal polymer composition as claimed in claim 1, wherein the multimodal polymer is a bimodal polyethylene produced by (co)polymerisation in at least two steps.

4. A multimodal polymer composition as claimed in claim 1, wherein the ethylene copolymer of the HMW fraction is a copolymer of ethylene and a comonomer selected from the group consisting of 1-butene, 1-hexene, 4-methyl-1-pentene, and 1-octene.

5. A multimodal polymer composition as claimed in claim 1, wherein the amount of comonomer is 0.1–2.0 mol % of the multimodal polymer.

6. A multimodal polymer composition according to claim 1, having a weight ratio of the LMW fraction to the HMW fraction of (43–51):(57–49).

7. A multimodal polymer composition as claimed in claim 1, wherein the multimodal polymer has an MFR₅ of 0.1–1.0 g/10 min.

8. A multimodal polymer composition as claimed in claim 1, wherein the polymer is obtained by slurry polymerisation in a loop reactor of a LMW ethylene homopolymer fraction, followed by gas-phase polymerisation of a HMW ethylene copolymer fraction.

9. A multimodal polymer composition as claimed in claim 8, wherein the slurry polymerisation is preceded by a prepolymerisation step.

10. A multimodal polymer composition as claimed in claim 9, wherein the polymer is obtained by prepolymerisation in a loop reactor, followed by slurry polymerisation in a loop reactor of a LMW ethylene homopolymer fraction, and gas-phase polymerisation of a HMW ethylene copolymer fraction.

11. A multimodal polymer composition as claimed in claim 8, wherein polymerisation procatalyst and cocatalyst are added to the first polymerisation reactor only.

12. A multimodal polymer composition as claimed in claim 11, wherein the polymerisation catalyst is a Ziegler-Natta type catalyst.

13. A pipe characterised in that it is a pressure pipe comprising the multimodal polymer composition according to any one of the preceding claims, which pipe withstands a pressure of 8.0 MPa gauge during 50 years at 20° C. (MRS8.0).

14. A pipe as claimed in claim 13, wherein the pipe is a pressure pipe withstanding a pressure of 10 MPa gauge during 50 years at 20° C. (MRS10.0).

15. A pipe as claimed in claim 13, wherein the pipe has a rapid crack propagation (RCP) S4-value, determined according to the ISO 13477:1997(E), of −5° C. or lower.

16. A pipe as claimed in claim 15, wherein the pipe has a rapid crack propagation (RCP) S4-value, determined according to ISO 13477:1997(E), of −7° C. or lower.

17. A pipe as claimed in claim 13, wherein the pipe has a slow crack propagation resistance, determined according to ISO 13479:1997, of at least 500 hrs at 4.6 MPa/80° C.

18. A process for producing a bimodal polyethylene composition, which process comprises catalytically polymerising ethylene sequentially in a prepolymerisation stage, a loop-reactor stage and a gas phase reactor stage, and in which:

the whole of the catalyst used in the process is charged, together with ethylene, to the prepolyerisation stage in which slurry polymerization is carried out in a loop reactor to produce an ethylene homopolymer constituting from 1 to 5% weight of the final bimodal polyethylene product;

the catalyst/polymer slurry proceeds from the prepolymerisation stage to said loop reactor stage in which further slurry polymerization is carried out at a temperature of 92 to 98° C. in the presence of hydrogen and ethylene at a $H_2$/ethylene mole ratio of 200 to 800 mol/kmol;

catalyst/polymer slurry from said loop reactor stage proceeds to the gas reactor stage in which polymerization is carried out at a temperature of 75–90° C. with the addition of 1-hexene comonomer in the presence of hydrogen and ethylene at a $H_2$/ethylene mole ratio no greater that 50 mol/kmol;

the weight ratio of ethylene homopolymer to ethylene-hexene-1 copolymer in the final bimodal product being 43–51:57–49, said product containing 0.1 to 2.0 mol % of said comonomer; and wherein the bimodal polyethylene product obtained is compounded with carbon black as filler or colorant and extruded into pipe.

* * * * *